(12) United States Patent
Horacek

(10) Patent No.: US 7,059,625 B2
(45) Date of Patent: Jun. 13, 2006

(54) REHABILITATION STROLLER

(75) Inventor: Gregor Horacek, Ransbach-Baumbach (DE)

(73) Assignee: Otto Bock HealthCare IP GmbH & Co., KG, Duderstadt (DE)

( * ) Notice: Subject to any disclaimer, the term of this patent is extended or adjusted under 35 U.S.C. 154(b) by 75 days.

(21) Appl. No.: 10/436,206

(22) Filed: May 13, 2003

(65) Prior Publication Data

US 2003/0230871 A1  Dec. 18, 2003

(30) Foreign Application Priority Data

May 15, 2002  (DE) ................................ 102 21 452

(51) Int. Cl.
*B62B 1/00* (2006.01)
(52) U.S. Cl. .................... 280/642; 280/657; 280/47.38
(58) Field of Classification Search ................ 280/657, 280/658, 642, 647, 650, 79, 47.34, 47.38, 280/47.4, 38, 47.41, 638, 639; 297/16.1, 297/183.1, 183.7
See application file for complete search history.

(56) References Cited

U.S. PATENT DOCUMENTS

| 3,891,236 | A | * | 6/1975 | Kuwano et al. | ............ | 280/283 |
| 4,491,335 | A | * | 1/1985 | Evron | ............... | 280/47.41 |
| 4,527,665 | A | * | 7/1985 | Shamie | ............ | 188/200 |
| 5,364,119 | A | * | 11/1994 | Leu | ............ | 280/647 |
| 5,522,614 | A | * | 6/1996 | Eyman et al. | ............... | 280/642 |
| 6,276,759 | B1 | * | 8/2001 | Lan | ............ | 301/111.06 |
| 6,443,467 | B1 | * | 9/2002 | Black | ............ | 280/47.38 |
| 6,739,616 | B1 | * | 5/2004 | Lin | ............ | 280/642 |
| 6,742,791 | B1 | * | 6/2004 | Lan | ............ | 280/62 |
| 2002/0050700 | A1 | * | 5/2002 | Stohr et al. | ............... | 280/650 |

FOREIGN PATENT DOCUMENTS

| DE | 35 26 264 C2 | 5/1988 |
| DE | 40 22 369 A1 | 1/1992 |
| DE | 40 04 536 C2 | 2/1992 |
| DE | 199 39 634 A1 | 2/2001 |

\* cited by examiner

*Primary Examiner*—Christopher P. Ellis
*Assistant Examiner*—Brian Swenson
(74) *Attorney, Agent, or Firm*—Greenblum & Bernstein, P.L.C.

(57) ABSTRACT

A stroller, in particular a rehabilitation stroller, having a front frame which extends upward to the rear, at an angle <90° to the ground and has two front frame struts, which are directed forward and downward and are equipped at their respectively lower ends with front wheels, and has a push bar at its rear, upper end, and having a rear frame which extends downward to the rear and is fastened at its upper end to the front frame and/or to the push bar thereof and is equipped at its rear, lower end with rear wheels. In order to obtain optimum shock absorption for the child and optimum maneuverability of the stroller, the latter comprises, according to the invention, a frame construction which serves as a seat carrier or is actually part of a seat, is guided in a longitudinally displaceable manner on the two front frame struts and is supported with respect to the front frame struts on at least one spring bearing, the spring force of which can be adjusted.

8 Claims, 3 Drawing Sheets

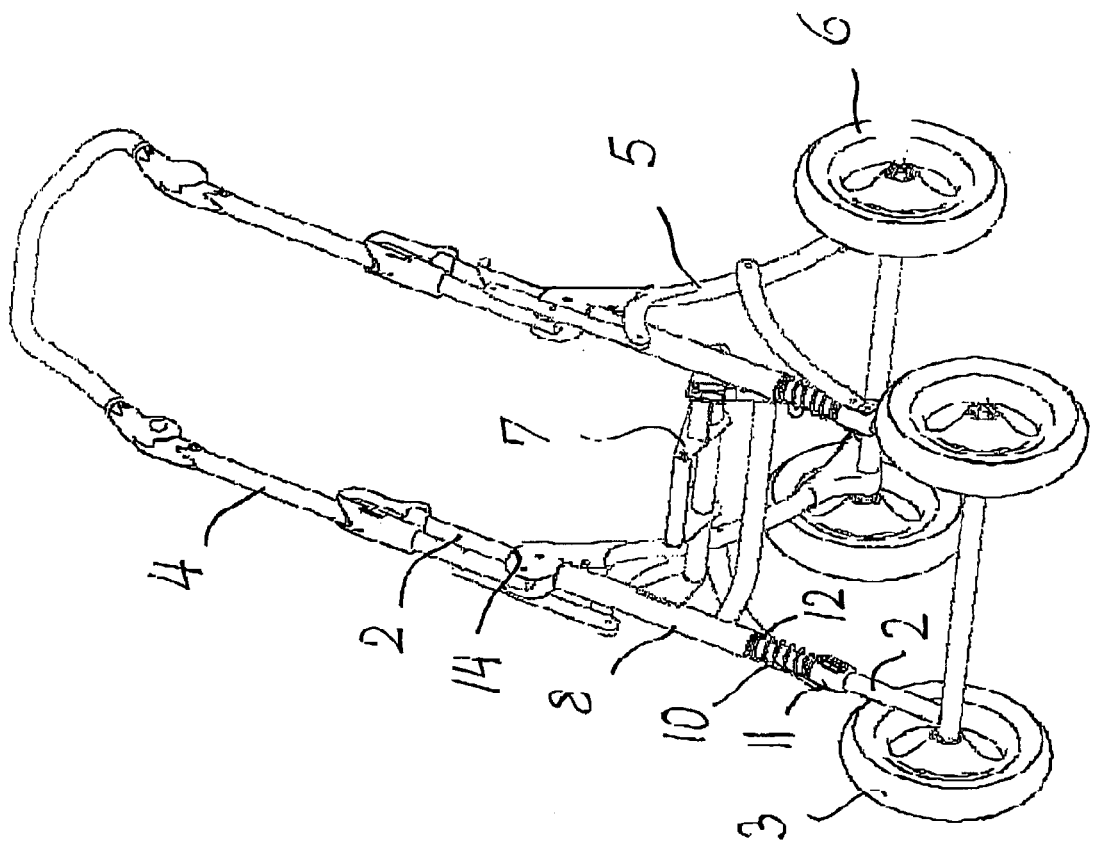

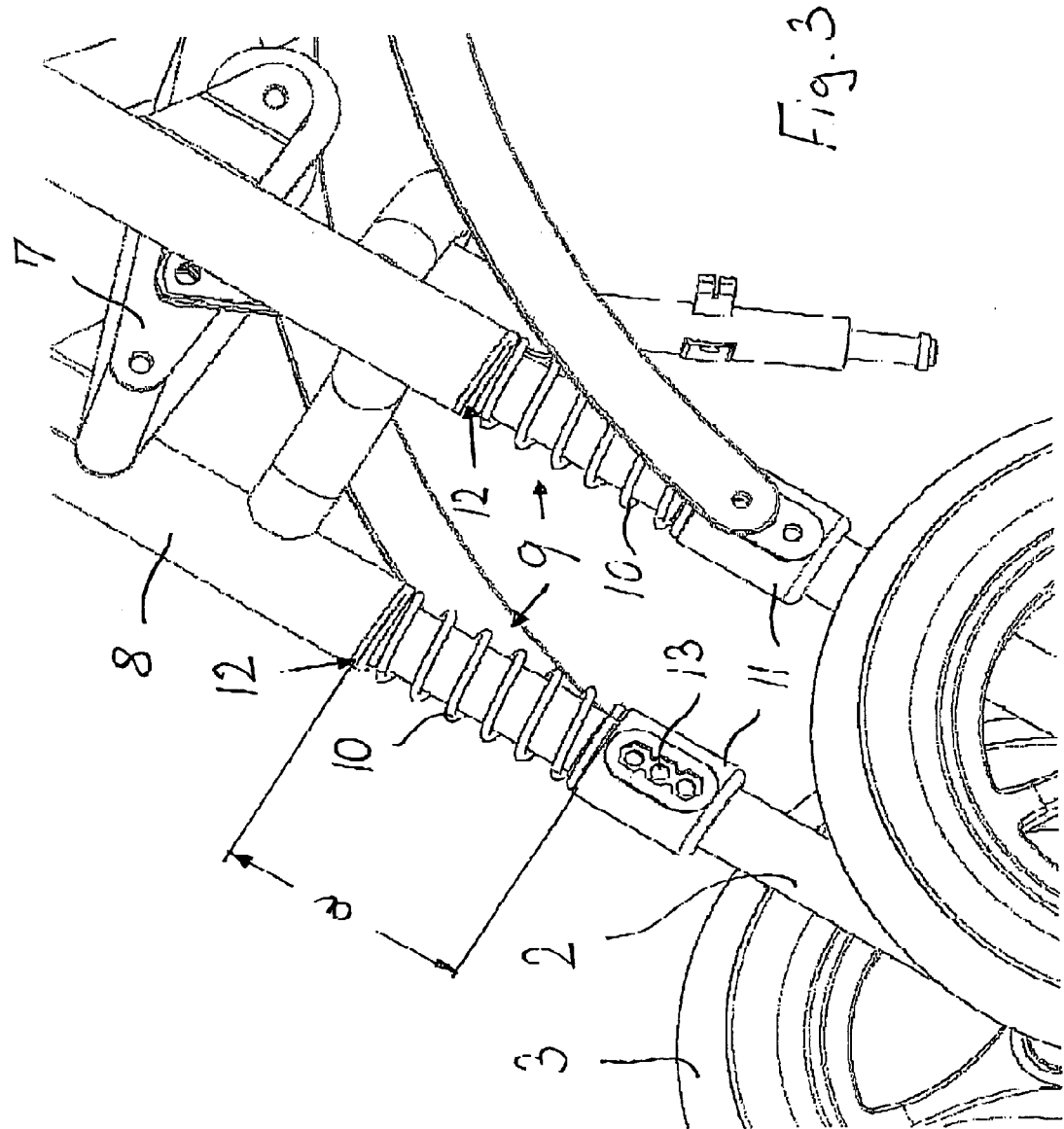

REHABILITATION STROLLER

The invention relates to a stroller, in particular a rehabilitation stroller, having a front frame which extends upward to the rear, at an angle <90° to the ground and has two front frame struts, which are directed forward and downward and are equipped at their respectively lower ends with front wheels, and has a push bar at its rear, upper end, and having a rear frame which extends downward to the rear and is fastened at its upper end to the front frame and/or to the push bar thereof and is equipped at its rear, lower end with rear wheels.

A stroller of this type, which is designed as a collapsible pushchair, can be seen, for example, in DE 40 04 536 C2. Many strollers of this type have cushioning devices for shock absorption. In this case, a substantial differentiation is made between cushioning devices for shock absorption. In this case, a substantial differentiation is made between cushioning the entire base frame of the undercarriage with respect to the structure having the seat, cushioning the individual axles with respect to the rest of the undercarriage or else cushioning the individual wheels with respect to the rest of the undercarriage. For example, DE 199 39 634 A1 reveals a stroller having a scissors-like undercarriage in which the cushioning has been placed in the point of articulation of the scissors, so that the ground reaction forces are cushioned.

In all of the previous proposals, a comprise has been made between comfort for the child (maximum shock absorption) and good handling (maneuverability) of the stroller. Cushioning which is too soft (high degree of comfort) results in poor handling, cushioning which is too hard (good handling ) results in poor comfort and defective shock absorption.

For the non-disabled sector, optimum tailoring is relatively simple to obtain, since the age range of the children traveling in a stroller is restricted to a few years and therefore the weight spectrum that has to be taken into consideration does not exhibit any great differences. In contrast, in the disabled sector, children in an age range of between 1 and approximately 12 years have to travel in strollers (then in wheelchairs or seat shells with appropriate underframes). This results in a weight spectrum of approximately 8 kg to 40 kg. However, cushioning tailored to a child weighing 40 kg would provide scarcely any shock absorption for a child weighing 8 kg while, conversely, if tailored to a light weight, the spring travel alone would be consumed by the weight of a child weighing 40 kg. However, it is precisely in the disabled sector where measures have to be taken against incorrect positions and incorrect loads by means of appropriate positioning and support that shock loads are counterproductive and in many cases cannot be tolerated at all.

Attempts have been made up to now in technical rehabilitation to counteract this problem by using appropriate upholstery in a one-off manufacturing process. However, this effect is often insufficient; in addition, one-off manufacturing processes are always associated with extremely high costs.

The invention is therefore based on the object of developing cushioning for the stroller described at the beginning, in particular a rehabilitation stroller, the cushioning ensuring, firstly, optimum shock absorption for the child and, secondly, optimum maneuverability of the stroller; steering and tilting movements are always to be passed on directly and are not to be obstructed by the sponginess of cushioning which is too soft.

Starting from the stroller described at the beginning, this object is achieved according to the invention by a frame construction which serves as a seat carrier or is actually part of a seat, is guided in a longitudinally displaceable manner on the two front frame struts and is supported with respect to the front frame struts on at least one spring bearing, the spring force of which can be adjusted.

In the case of the stroller designed according to the invention, only the seat unit is therefore cushioned, with it being possible to adapt the cushioning to co-ordinate it with the particular body weight of the child. In contrast, the wheels and axles remain uncushioned so as to ensure optimum maneuverability.

A stable and, at the same time, low-maintenance construction is ensured if the frame construction is guided telescopically on the front frame struts by means of a respective sliding tube.

In principle, it would be possible to provide just one spring bearing between a transverse strut of the said frame construction and a transverse strut connecting the two front frame struts to each other. However, a solution which is better in terms of construction and function is provided according to the invention if each front frame strut is assigned a spring bearing which has a compression spring which is supported at its lowest end on an abutment of the front frame struts and at its upper end on an abutment of the frame construction, at least one of these abutments being arranged in an adjustable manner in terms of the longitudinal distance between the two abutments and being fixable in the desired position. A spring bearing provided on just one side is also conceivable.

An adjustable abutment could be designed, for example, as a cam disk with cams at differing heights or else as threaded bushings which can be rotated on the front frame struts and/or the sliding tubes. A sliding bushing in each case surrounding a front frame strut and having a pattern of holes permitting this bushing to be fixed in the desired longitudinal displacement position with respect to the front frame strut appears expedient here. The prestress of the compression springs can thereby be co-ordinated in a simple manner with the weight to be held in each case so as thereby to obtain optimum shock compensation.

It is furthermore expedient if an upper stop limiting the maximum deflection of the frame construction is provided on each front frame strut. At an appropriate load (weight, shock load), the frame construction moves downward counter to the force of the two compression springs on the front frame struts, at maximum until blocking the compression springs.

The drawing illustrates an embodiment of the invention which serves as an example. In the drawing FIG. 1 shows a stroller in side view;

FIG. 2 shows the stroller according to FIG. 1 in a perspective front view, and

FIG. 3 shows, on an enlarged scale in a perspective illustration, a subregion of the stroller according to FIG. 2.

Figure 1:
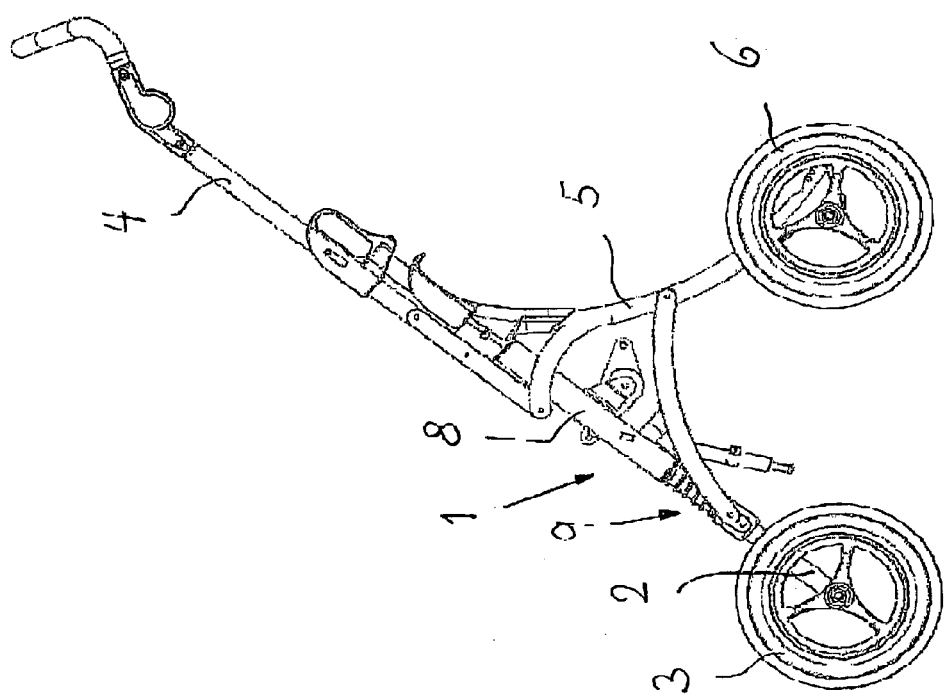

The stroller which is illustrated has a front frame 1 which extends upward to the rear, at an angle of between approximately 35° and 60° to the ground and comprises two front frame struts 2, which are directed forward and downward and are equipped at their lower ends with front wheels 3. The front frame 1 has a push bar 4 at its rear, upper end.

The stroller furthermore has a rear frame 5 which extends downward to the rear, is fastened at its upper end to the front frame 1 and/or to the push bar 4 thereof and is equipped at its rear, lower end with rear wheels 6.

The stroller may be designed as a collapsible pushchair.

Provision is furthermore made of a frame construction 7 which serves as a seat carrier or is actually part of a seat, is guided in a longitudinally displaceable manner telescopically on the two front frame struts 2 by means of a respective sliding tube 8 and is supported with respect to these front frame struts 2 on a respective spring bearing 9, the spring force of which can be adjusted.

The spring bearing 9 assigned to each front frame strut 2 comprises a compression spring 10, a lower abutment 11 and an upper abutment 12. In this case, the compression spring 10 is supported at its lower end on the abutment 11 of the front frame strut 2 and at its upper end on the lower end of the associated sliding tube 8, which end forms the abutment 12. It can be seen from FIG. 3 that the lower abutment 11 is designed as a bushing which surrounds the front frame strut 2 and is provided with a pattern of holes 13 which shows that, for the purpose of changing the longitudinal distance a between the two abutments 11, 12, this abutment 11 is arranged in a longitudinally displaceable manner on the front frame strut 2 and can be fastened in the respectively desired position.

An upper stop 14 limiting the maximum deflection of the frame construction 7 is provided on each front frame strut 2, it being possible for the stop to be the mounting of the push bar 4.

Longitudinal adjustment of the abutments 11 enables the prestress of the compression springs 10 to be increased or else reduced and, as a result, the spring prestress can be set in such a manner that optimum shock compensation is obtained for any body weight of the child to be carried.

The invention claimed is:

1. A stroller comprising a front frame which extends upward to the rear, at an angle <90° to the ground and has two front frame struts, which are directed forward and downward and are equipped at their respectively lower ends with front wheels, and has a push bar at its rear, upper end, and having a rear frame which extends downward to the rear and is fastened at its upper end to the front frame and/or to the push bar thereof and is equipped at its rear, lower end with rear wheels, which comprises a frame construction which serves as a seat carrier or is actually part of a seat, is guided in a longitudinally displaceable manner on the two front frame struts and is supported with respect to the front frame struts on at least one spring bearing, the spring force of which can be adjusted.

2. The stroller as claimed in claim 1, wherein the frame construction is guided telescopically on the front frame struts by means of a respective sliding tube.

3. The stroller as claimed in claim 1, wherein each front frame strut, is assigned a spring bearing which has a compression spring which is supported at its lower end on an abutment of the front frame struts and at its upper end on an abutment of the frame construction, at least one of these abutments being arranged in an adjustable manner in terms of the longitudinal distance between the two abutments and being fixable in the desired position.

4. The stroller as claimed in claim 1, wherein an upper stop limiting the maximum deflection of the frame construction is provided on each front frame strut.

5. The stroller as claimed in claim 1, wherein the adjustable spring bearing comprises an upper abutment and a lower abutment disposed on the two front frame struts.

6. The stroller as claimed in claim 5, wherein the lower abutment is a sliding tube which guides, telescopically, the rear frame member on the front frame struts.

7. The stroller as claimed in claim 5, further comprising a plurality of holes provided on the front frame struts, the plurality of holes being aligned with the lower abutment to adjustably change a distance between the lower abutment and the upper abutment.

8. A stroller comprising:
   a front frame member having two front frame struts which are equipped at their respectively lower ends with front wheels;
   a push bar provided at a rear, upper end of the front frame member;
   a rear frame fastened at its upper end to the front frame member and/or to the push bar and being guided in a longitudinally displaceable manner on the two front frame struts by at least one adjustable spring bearing comprising a lower abutment longitudinally displaceable along at least one of the two front frame struts; and
   a plurality of holes provided on the two front frame struts, the plurality of holes being aligned with the lower abutment to adjustably change a distance between the lower abutment and an upper abutment.

* * * * *